Sept. 2, 1952 R. M. WILMOTTE 2,609,493

FREQUENCY MODULATION RECEIVER FOR OVERLAPPING SIGNALS

Filed Jan. 24, 1950 3 Sheets-Sheet 1

INVENTOR.
RAYMOND M. WILMOTTE
BY Hyman Hurvitz
his ATTORNEY

INVENTOR.
RAYMOND M. WILMOTTE
BY Hyman Hurwitz
his ATTORNEY

INVENTOR
RAYMOND M. WILMOTTE

BY Hyman Hurwitz
his ATTORNEY

UNITED STATES PATENT OFFICE 2,609,493

FREQUENCY MODULATION RECEIVER FOR OVERLAPPING SIGNALS

Raymond M. Wilmotte, Washington, D. C., assignor to Padevco, Inc., Washington, D. C., a corporation of Delaware Application January 24, 1950, Serial No. 140,242

11 Claims. (Cl. 250—20)

The present invention relates generally to apparatus and methods for the separation of signals overlapping in frequency, and more particularly to methods and apparatus for selectively separating two overlapping frequency modulated carriers.

It is a broad object of the present invention to provide novel methods and apparatus for selectively separating two frequency modulated signals, which overlap in frequency, and which are of different amplitudes.

It is another broad object of the invention to provide a system for detecting modulation inherent on a first frequency modulated carrier, in the presence of another weaker overlapping frequency modulated carrier, with substantial reduction of interference from the latter.

It is still another object of the present invention to provide circuits for selectively detecting frequency modulations of two superposed or overlapping carriers, in response to signals obtained by sampling of the superposed carriers at selected time intervals.

It is another object of the present invention to provide circuits for demodulating the stronger of two overlapping frequency modulated carriers, without interference from the weaker, when the weaker has an amplitude approaching that of the stronger, by a process of timed sampling.

The above and still further objects, features and advantages of the present invention will become apparent upon consideration of the following detailed description of a specific embodiment thereof, especially when taken in conjunction with the accompanying drawings, wherein.

Suppose two signals, which may be represented, in respect to instantaneous values, by $$E_1=\sin wt,\ E_2=a\sin(w+q)t$$

where a <1 and $q$ is the instantaneous difference in the frequencies of the signals, and which may be positive or negative, at random, as time proceeds.

The sum of the two signals is $$E=E_1+E_2=R\sin(wt+\alpha) \quad (1)$$

where $$R^2=1+a^2+2a\cos qt \quad (2)$$

and $$\tan\alpha=\frac{a\sin qt}{1+a\cos qt} \quad (3)$$

Figures 1, 2:
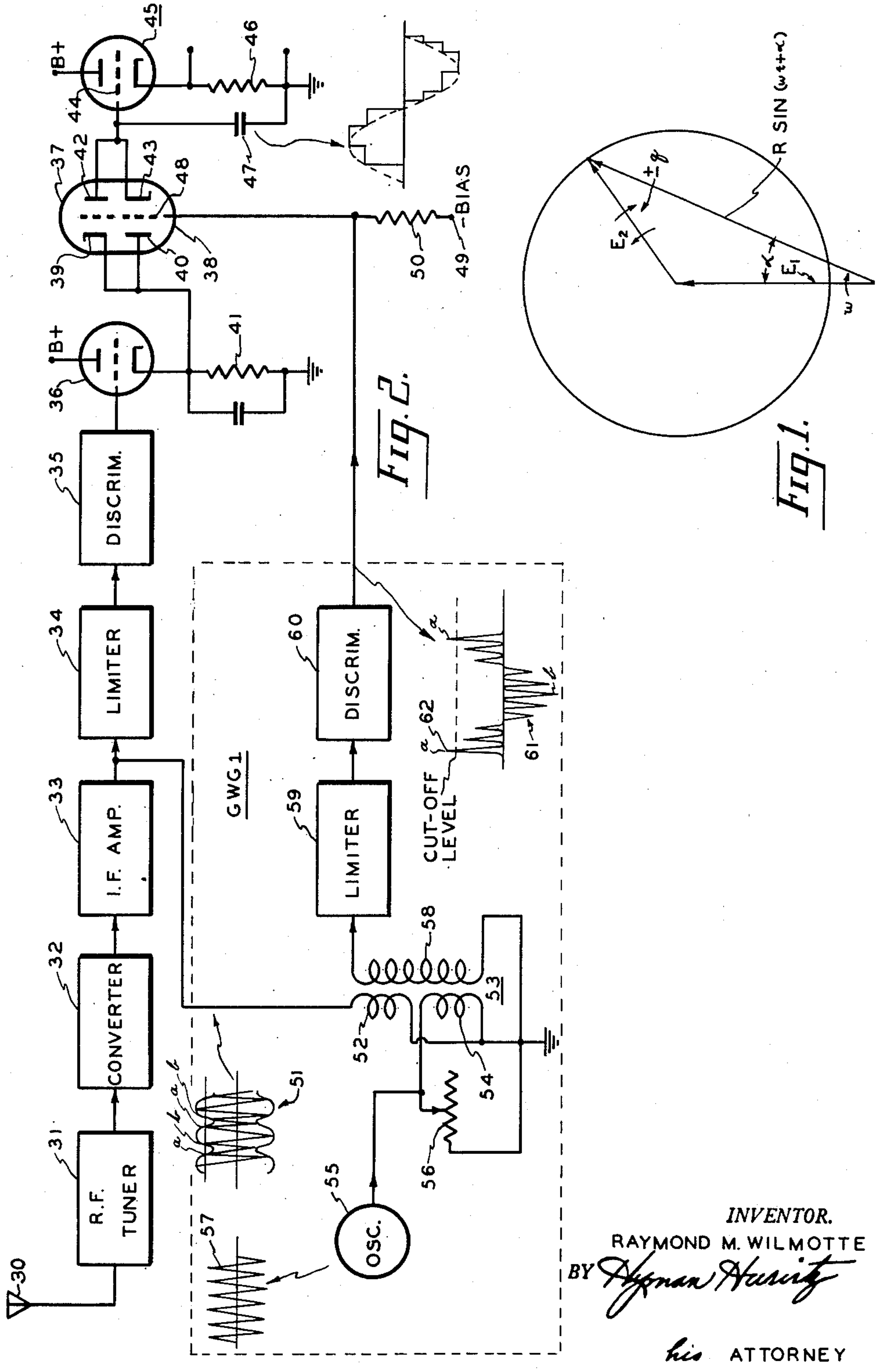
Figure 1 is a vector diagram of certain voltages occurring in the system of the present invention.
Figure 2 is a schematic and block circuit diagram of a specific embodiment of the invention.

Referring specifically to Figure 1 of the accompanying drawings, there is illustrated the vectors $E_1+E_2$, added together, and labelled in respect to the significance of the various parameters of Equations 1–3 inclusive. In the discussion which follows it is taken that $qt=0$ when $E_2$ is collinear with and directed in the same sense as $E_1$, i. e., at the crests of the beat frequencies.

It may be shown, then, that $$\frac{d(wt+\alpha)}{dt}=w+\frac{aq(a+\cos qt)}{R^2} \quad (4)$$

$$\frac{dR}{dt}=\frac{-aq\sin qt}{R} \quad (5)$$

$$=-q\sin\alpha \quad (6)$$

$$R\frac{d(wt+\alpha)}{dt}=Rw+\frac{aq(a+\cos wt)}{R} \quad (7)$$

(8)

$$\int_0^{\psi}\frac{Rd(wt+\alpha)}{dt}d(qt)=2(1+a)E(\psi/2,k)w+[(1+a)E(\psi/2,k)-(1-a).F(\psi/2,k)]q$$

where $$k2=\frac{2a}{(1+a)^2}$$

When the values of the quantities $$R,\ \frac{d(wt+\alpha)}{dt},\ +R\frac{d(wt+\alpha)}{dt}$$

are calculated for certain values of $qt$, the following table may be constructed. This table gives the values of the quantities in terms of $a$, and of signals derivable from $q$ and $w$ by frequency discrimination when $$qt=\pm\frac{\pi}{2}$$

0 and $\pi$ radians and for two further values, i. e., for the difference and the sum of the quantities, taken at 0 and $\pi$ radians.

*Table*

| | qt | (1) $\pm\pi/2$ | (2) 0 | (3) $\pi$ | (4) $(0)-(\pi)$ | (5) $(0)+(\pi)$ |
|---|---|---|---|---|---|---|
| (a) | $R$ | $\sqrt{1+a^2}$ | $1+a$ | $1-a$ | $2a$ | 2 |
| (b) | $d(wt+\alpha)/dt$ | $w+\frac{qa^2}{1+a^2}$ | $w+\frac{qa}{1+a}$ | $w-\frac{qa}{1-a}$ | $\frac{2qa}{1-a^2}$ | $2w-\frac{2qa^2}{1-a^2}$ |
| (c) | $Rd(wt+\alpha)/dt$ | $\sqrt{1+a^2}.w+\frac{qa^2}{\sqrt{1+a^2}}$ | $w(1+a)+qa$ | $w(1-a)-qa$ | $2a(w+q)$ | $2w$ |

It is apparent, from Equation 2 that $R^2$ varies with cos $qt$, which means that the superposed waves $E_1$ and $E_2$, in the sum, are amplitude modulated in accordance with a cosine function at the frequency $q$. This is also intuitively obvious from Figure 1. The frequency $q$ can readily be derived, then from the superposed waves by means of an amplitude detector. Values of $$\frac{d(wt-\alpha)}{dt}$$

may be measured by means of a limiter and discriminator.

In accordance with the present invention, selected portions of the radio frequency envelope of the superposed waves may be gated under the control of the modulation wave at frequency $q$, to obtain the frequency $$\frac{d(wt+\alpha)}{dt}$$

for only the angles or values of $qt$ specified in the table, columns (1), (2), (3). When so obtained simple voltage combinations provide the quantities specified in columns (4) and (5).

Additionally the quantity $$R\frac{d(wt+\alpha)}{dt}$$

may be derived at the angles specified in columns (1), (2), and (3), by multiplying the value of R at these angles by the value derived for $$\frac{d(wt+\alpha)}{dt}$$

at these angles, in a conventional multiplier, the value of R being obtainable by suitably gating the result of amplitude detecting the superposed waves. The values required for columns (4) and (5) may be derived by simple subtraction or addition of voltages, as required.

From the quantities specified in rows $b$ and $c$, the signals corresponding with frequencies $w$ and $(w+q)$ may be readily derived.

For example, the quantity specified in block 5c of the table is a multiple of the frequency $w$, and the quantity specified in block 4c contains a quantity proportional to the frequency $(w+q)$.

Since the frequency $q$ may be readily derived by a demodulation process, addition or substraction of frequencies in suitable circuits may be employed to obtain the quantities in the remaining blocks.

As one mode of receiving the stronger of two overlapping frequency modulated signals to the exclusion of the weaker, use may be made of the fact that when $$\frac{d\alpha}{dt}=0,\ \frac{d(wt+\alpha)}{dt}=w$$

and that this may be calculated to occur when $qt=\pi\pm$ arc cos $a$. If, therefore, the radio frequency at one or both of these points, in each cycle of beat frequency, is selected and applied to a discriminator, the result will be the stronger signal at frequency $w$, free from distortion due to the weak signal.

Essentially, this type of operation may be accomplished approximately by sampling the two superposed signals $E_1$ and $E_2$ when $$qt=\pm\frac{\pi}{2}$$

which occurs when the beat envelope has an amplitude near the mean, or unmodulated carrier level, of the stronger signal. This condition is substantially accurate when the ratio $a$, of the amplitudes of the signals, is small. When, however, the value of $a$ is relatively large, it may be shown that an optimum operating point exists when $qt=\pi\pm$ arc cos $a$, hereinafter sometimes referred to as "arc cos $a$ points," noting that $\pi\pm$ arc cos $a$ approaches $$\frac{\pi}{2}$$

as $a$ becomes smaller.

Essentially, then, demodulation of the stronger of two overlapping FM signals is accomplished, to the exclusion of the weaker, by sampling the overlapping signals at selected times, or at selected points in the beat frequency cycle thereof, and preferably when $qt=\pi\pm$ arc cos $a$. Sampling is preferably accomplished by generating gating pulses at the desired times, and passing the overlapping carriers to a detector only in response to the gating pulses, or alternatively, detecting the overlapping carriers and passing detected signal to a reproducer only in response to the gating pulses.

The gating pulses themselves may be generated in a variety of ways, which will appear as the description proceeds. In addition provision is made for smoothing out the signals generated in response to the gating pulses to construct a true audio signal. The smoothing process may be carried out by a smoothing filter, if desired, but it is found that electronic smoothing devices are preferable to filters, in practice, because of the wide range of pulse frequencies which must be handled in the system. I have accordingly provided an electronic smoothing circuit which is, per se, novel, for the purpose.

Referring now to Figure 2 of the accompanying drawings, the reference numerals 30, 31, 32, 33, 34, 35, denote respectively, an antenna, R. F. tuner, frequency converter, I. F. amplifier, limiter and discriminator of a conventional FM receiver. It is assumed that the signals $E_1$ and $E_2$ of Figure 1 are being simultaneously received, and that it is desired to demodulate the stronger signal without interference from the weaker, and that the strength of the weaker signal $E_2$ may be sufficiently great to render this impossible by conventional methods. The latter condition is not a necessary one.

Figure 3:
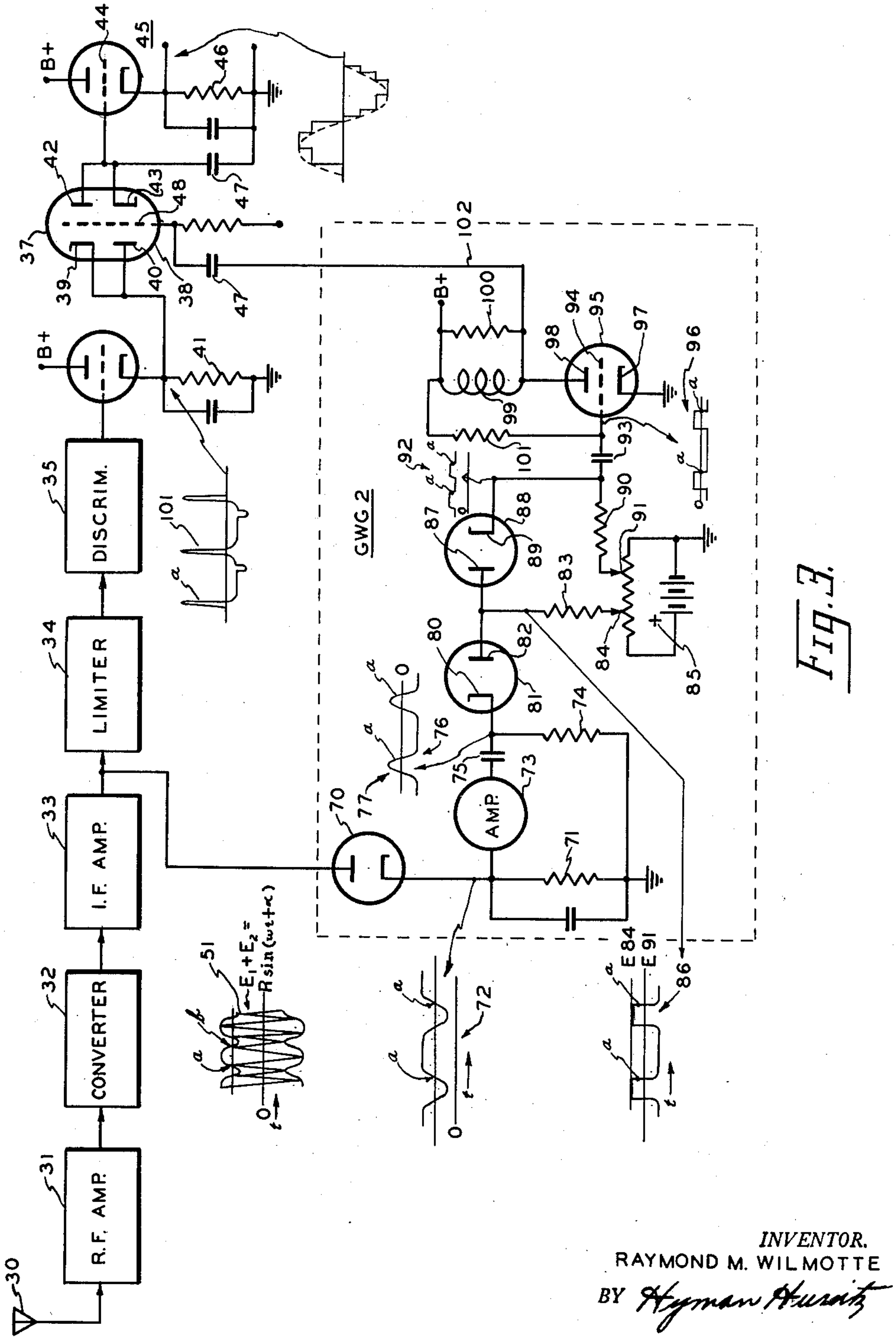
Figure 3 is a schematic and block circuit diagram of a further specific embodiment of the invention.

In order to demodulate the stronger signal without interference from the weaker use is made of the fact that the superposed wave $R \sin (wt+\alpha)$ has the frequency $w$ when $$qt=\pi\pm\text{arc cos } a$$

but not otherwise, so that pulses of frequency $w$, at the input to a discriminator, or signals of amplitude corresponding with $w$, may be made available by gating the wave $R \sin (wt+\alpha)$ at times when $qt=\pi\pm\text{arc cos } a$. The problem remains then of generating a gating wave at such times. This problem is solved in the embodiment of the invention illustrated in Figure 2 of the drawings by a manually controllable amplitude gating process. In Figure 3 a method of selecting the arc cos $a$ point is utilized which relies on the fact that when two waves are beat together, one of which is frequency modulated and the other not, very rapid rates of change of phase, which are equivalent to frequency shifts, occur when the relative phase of the two waves passes in phase opposition. These frequency shifts are the greater the nearer in amplitude the two waves are, and have a sense dependent on the sense in which the change in phase takes place or the algebraic sign of the rate of change of phase. If the frequency modulated wave is a composite wave obtained by beating two frequency modulated waves, such as $E_1$ and $E_2$, Figure 1, and hence one which varies in amplitude, the frequency shifts referred to will be of varying extent as the beat wave changes in amplitude with respect to the amplitude of the unmodulated wave, and of opposite directions as the amplitude increases and decreases, respectively, and it will be found that the maximum shift may be made to occur precisely at the arc cos $a$ points, by properly selecting the amplitude of output of the local oscillator.

The frequency shifts may be discriminated to provide waves of varying amplitude, and the strongest of these waves selected by an amplitude selection process and utilized as gating waves.

Referring now again to Figure 2 of the drawings, the output of discriminator 35 is applied to the input of a cathode follower 36, and thence applied to a gating tube comprising back-to-back connected gating triode sections 37 and 38. The cathode 39 of section 37 and the anode 40 of section 38 are connected directly to cathode load 41 of cathode follower 36, and the anode 42 of section 37 together with the cathode 43 of section 38 are connected directly to the control electrode 44 of a cathode follower 45, having an output resistance 46 in its cathode circuit and a smoothing condenser 47 connected between control electrode 44 and ground.

The triode sections 37 and 38 are normally maintained nonconductive by means of a negative bias connected to the control electrode 48 thereof from a source 49. This bias may be overcome by applying a sufficient positive voltage across resistance 50, in series between control electrode 48 and bias source 49. When the bias is overcome sufficiently the gating sections 37 and 38 pass alternating current, since, taken together they are bilaterally conductive by reason of their back-to-back connection.

On-gating pulses for the back-to-back gating triode sections 37 and 38 are developed as follows: I. F. output from amplifier 33, consisting of wave 51, $R \sin (wt+\alpha)$, or $E_1+E_2$, and having thereon points $a$ and $b$ occurring at times $qt=\pi\pm$ arc cos $a$, is applied to one primary winding 52 of a transformer 53. To a further primary winding 54 of transformer 53 is applied steady A.-C. wave from an oscillator 55 via an adjustable attenuator 56. The frequency of the output 57 of oscillator 55 is separated from the frequencies $w$ or $w+q$ by at least one channel.

The wave 57 is then added to the wave 51 in the secondary winding 58 of transformer 53, and secondary winding 58 connected to the input of a limiter 59. The latter is in turn connected to a discriminator 60, and the output of the latter is applied across resistor 50, in such sense as to develop positive pulses thereacross. These pulses, as illustrated at 61, are of varying amplitude and sense, as wave 51 varies in amplitude, but reach maximum positive values 62 only when the amplitude of wave 55 bears a predetermined relation to the ratio $a$ between $E_2$ and $E_1$. By proper adjustment of attenuator 56 the points selected may be at one of the $$qt=\pi\pm\text{arc cos } a$$

points, and $b$, of wave 51.

The bias applied to the gating sections 37 and 38 is such that only the positive peaks 62 gate the sections 37 and 38 on, as indicated by the cut-off level associated with wave 61. Hence there is applied to condenser 47, via gating sections 37 and 38, only those portions of wave 51 which occur at $qt=\pi\pm$ arc cos $a$, in the form of discrete pulses. These pulses are stored in condenser 47 for the time between pulses, and may be either positively going or negatively going in any order, since the condenser 47 may either charge or discharge through gating sections 37, 38, to extents depending on the polarity and amplitude of the last pulse applied from cathode follower 36, as compared with the immediately preceding pulse.

The condenser 47 in conjunction with the gating sections 37, 38 provide then a smoothing circuit for the pulse output from cathode follower 36, storing the amplitude of each pulse until a succeeding pulse arrives, and then assuming a voltage corresponding with the amplitude of the latter and storing that until a further succeeding pulse arrives.

The voltage variations developed across condenser 47 are duplicated across output resistor 46 of cathode follower 35, and an audio signal corresponding with the modulations in frequency of wave $w$ may be derived from across output resistance 46.

Referring now more specifically to Figure 3 of the accompanying drawings, there is illustrated a modification of the system of Figure 2 which utilizes some of the principles taught in Figure 2. More specifically, the system of Figure 3 employs amplitude gates, operating on the envelope of the wave $R \sin (wt+\alpha)$ to derive gating pulses at times when $qt=\pi\pm$ arc cos $a$. These gating pulses are applied to control a gating circuit which samples the discriminated superposed carriers at times when $qt=\pi\pm$ arc cos $a$, and applies the pulse samples to a smoothing circuit for construction of an audio wave.

Corresponding parts in Figures 2 and 3 are identified by the same numerals of reference.

The wave $R$ sin $(wt+\alpha)$, corresponding with $E_1+E_2$, possesses points $a$, which correspond with one value of $qt=\pi\pm$ arc cos $a$, and which are utilized to establish gating pulses. The wave 51 is applied to a conventional diode rectifier, 70, in the load resistance 71 of which is generated a wave form 72 corresponding with the positive envelope of wave 51, and which appears as a wholly positive wave, with points $a$ retained.

The wave 72 is amplified in beat amplifier 73, the latter accomplishing a phase inversion, and is applied across a load resistor 74 via a coupling condenser 75. The coupling condenser 75 removes the D.-C. component of the wave 72, so that its average value is zero. There appears across the load resistance 74, then, an A.-C. voltage 76, corresponding in wave form with wave 72, but phase inverted and having an average value of zero. The points $a$ now appear on the negatively going slopes of the spikes 77, by reason of the phase inversion effected by amplifier 73, rather than on the positively going slopes, as in wave form 72.

The ungrounded end of resistor 74 is connected to a cathode 80 of a diode 81, the anode 82 of which is connected via a load resistor 83 to an adjustably positive point 84 of a bias source 85. If the cathode 80 goes more positive than the anode 82 the diode 81 becomes non-conductive. While the cathode 80 is negative with respect to the anode the diode 81 conducts in proportion to the negative voltage. The diode 81 accordingly adjustably clips the positive peaks from the wave form 76, to provide a wave form 86, and the bias voltage provided by bias source 85 is so adjusted as to retain, by a narrow margin, the points $a$.

To the anode 82 of diode 81 is connected an anode 87 of a diode 88, having a cathode 89 connected via a load resistor 90 to a point 91 on bias source 85. The point 91 is negative with respect to point 84. The voltage at anode 87 must at all times be equal to, or negative with respect to, the voltage of point 84, according as diode 81 is non-conductive, or conducts. The bias voltage on cathode 89 is slightly negative with respect to the bias voltage on anode 87. Hence the diode 88 passes current only while the wave form 86 possesses voltage values between $E_{84}$ and $E_{91}$, after which anode 87 goes more negative than cathode 89, and the diode 88 becomes non-conductive.

Accordingly, the output voltage across load resistance 90 of diode 88 corresponds with wave shape 92, and consists of rectangular pulses superposed on a steady D.-C. value, the trailing or negatively going edges of the pulses occurring at times $a$, or encompassing the times $a$, since the trailing edges have finite slopes.

The wave 92 is applied via coupling condenser 93 to the control electrode 94 of a triode 95, and is transformed into a wave having zero D.-C. component by virtue of the capacitive coupling as illustrated at 96.

The cathode 97 of triode 95 is grounded, and the anode 98 is connected in series with an inductance 99 to a source of B+. The inductance 99 is shunted by a resistance 100, and B+ is connected to control electrode 94 via a high resistance 101, the resistance 101, in series with the grid-cathode internal resistance of triode 95, providing a voltage divider to establish a bias for grid 94 which is positive and which maintains the triode 95 normally in current conductive condition. In this condition current flows in inductance 99 and energy is stored therein.

At the instant when the trailing or negatively going edges of the pulses of wave form 96 occur, i. e., at times $a$, which, it will be recalled correspond with $qt=\pi\pm$ arc cos $a$, the triode 95 is cut off, and remains cut off until the wave form again goes positive.

When the triode 95 is cut off the energy in inductance 99 discharges through resistance 100, and also through any inherent capacity which may exist in the circuit.

The constants of the circuit are so selected that but a single energy discharge pulse occurs to accomplish the discharge, and the voltage generated is of such polarity that a positive voltage pulse 10 is applied to line 102, by Lenz's law. This voltage gates triode sections 37 and 38 on. The voltage pulses 101 occur, then, when $qt=\pi\pm$ arc cos $a$, and the output of the gating sections 37 and 38 corresponds with that obtainable in the system of Figure 2, and is similarly treated.

Enclosed in dotted lines in Figures 2 and 3 are circuits which per se function to generate gating waves, in response to the overlapping waves $E_1$ and $E_2$, or $R$ sin $(wt+\alpha)$, when $qt=\pi\pm$ arc cos $a$. The gating wave generator in Figure 2 may be identified by the letters GWG1, while the corresponding generator in Figure 3 may be identified by the letters GWG2. In the systems of Figures 2 and 3 the gating waves provided by gating wave generators GWG1 or GWG2 are applied to gate signals occurring beyond the discriminator. Gating may, alternatively, occur prior to the discriminator, as in the I. F. or R. F. circuits, and preferably the former. Modification of the system of Figure 2 is provided accordingly, in Figure 4, wherein gating occurs in the I. F. channel. Obviously, a similar modification of the system of Figure 3 may be resorted to, if desired.

Figure 5:
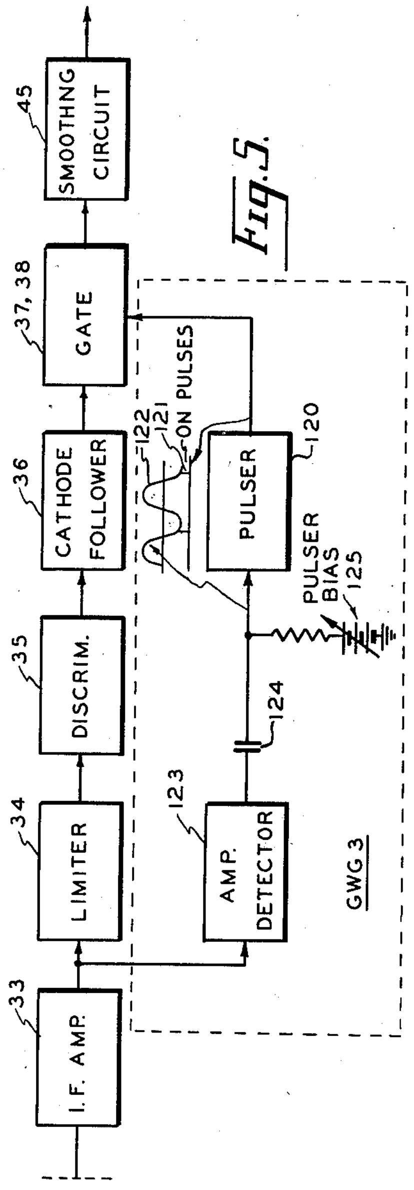
Figure 5 is a block diagram of a modification of the embodiment of the invention illustrated in Figures 2 and 3.

As a further modification of the invention, gating waves are provided when $$qt=\pm\frac{\pi}{2}$$

by means of a gating wave generator illustrated in Figure 5 of the drawings, for the reason that a gating wave generator of this character is especially simple. Essentially, such a gating wave generator utilizes the fact that $qt=\pi\pm$ arc cos $a$, approximately, when the amplitude detected envelope of $R$ sin $(wt+\alpha)$, with D.-C. component removed, passes through zero, and when $a$ is small. This embodiment of the invention is useful primarily when $a$ is small but may be readily modified to render the circuit useful for a wide range of values of $a$.

Figure 4:
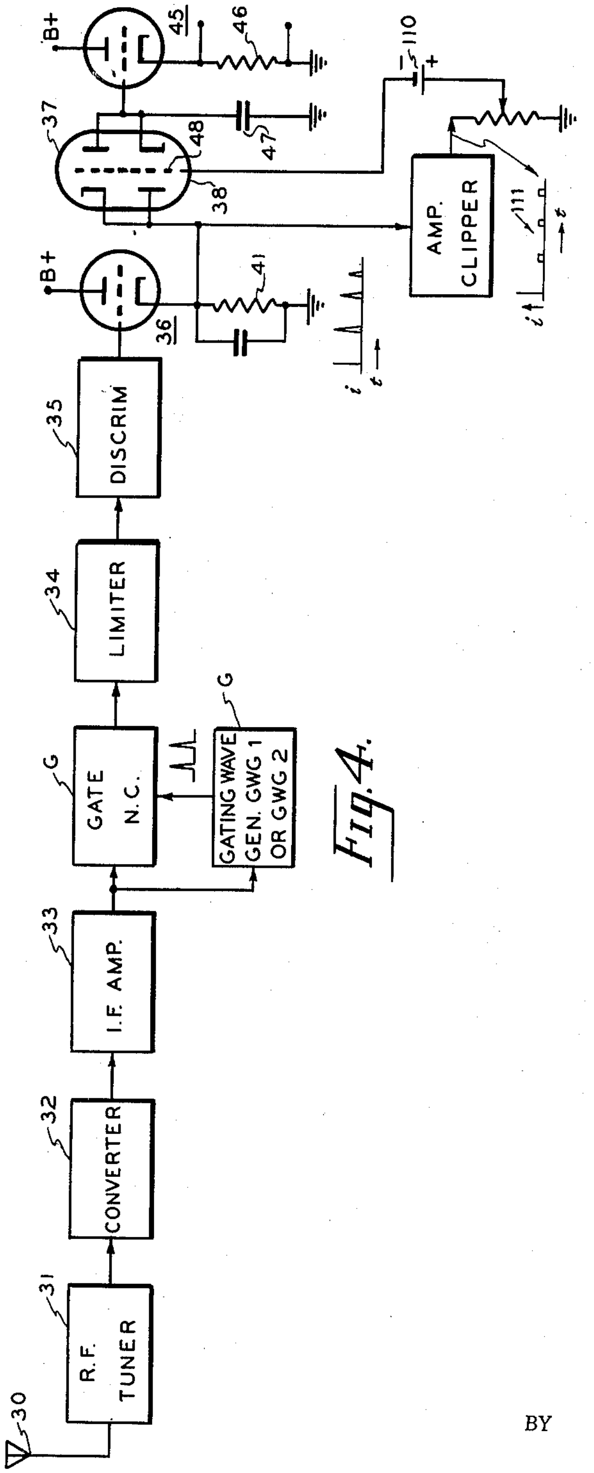
Figure 4 is a block diagram of a modification of the embodiment of the invention illustrated in Figures 2 and 3.

The gating wave generator of Figure 5 may be made more useful by adding to the detected envelope of $R$ sin $(wt+\alpha)$, with D.-C. component removed (see Figure 6), an adjustable D.-C. component, which shifts the effective cross over point of the envelope of $R$ sin $(wt+\alpha)$, on the point of polarity reversal of $R$ sin $(wt+\alpha)$, with D.-C. component, to a time which may be made to correspond with $qt=\pi\pm$ arc cos $a$, so that the system of Figure 5 provides an additional gating wave generator GWG3, supplementary to gating wave generators GWG1 and GWG2, and one which may be utilized in the systems of Figures 2, 3 and 4.

Since, in the gating systems of the embodiments of my invention illustrated in Figures 2 and 3, the gating waves applied to gate on the triode sections 37 and 38 must be of constant amplitude, if the amplitude of the gating pulses is not to be a factor in the output signal provided by cathode follower 45, it may prove desirable to clip the gating pulses to constant amplitude, as by means of a clipper stage between discriminator 60 and resistance 50, in Figure 2, and by a clipper stage inserted in the lead 102 of Figure 3. Additionally, it will be realized that the output derivable across output resistance 46, in Figures 2 and 3, will contain a D.-C. component due to the gating pulses. This D.-C. component may be effectively eliminated by applying output voltage, derived across resistance 46 to its utilization circuit, via a transformer or condenser coupling.

Referring more specifically to Figure 4 of the drawings, the system will be seen to duplicate the systems of Figures 2 and 3 except that gating sections 37 and 38 are no longer utilized for gating $E_1$ and $E_2$, but gating is accomplished in the I. F. amplifier 33, or between I. F. and limiter 34, by means a normally closed gate G, which is turned on in response to gating waves generated by gating wave generator H, which may correspond with GWG1 or GWG2.

The output of the discriminator 35 is applied to cathode follower 36, and is in the form of discrete pulses. These pulses, as taken from the load resistance 41 of cathode follower 36, are smoothed by passing the pulses through back-to-back gating triode sections 37, 38, to storage condenser 47. In order to enable storage condenser 47 to retain its charge between pulses, the double triodes 37, 38 are normally biased off by bias source 110, and rendered conductive in response to each pulse applied thereto. The latter function is accomplished by passing the pulses, as they appear across load resistance 41 of cathode follower 36, through an amplitude clipper, which provides at its output fixed amplitude pulses 111. These latter are of sufficient amplitude to overcome the bias supplied by source 110, and to turn on the gating triode sections 37 and 38 during the pulses. The pulses passed by gating triode sections 37 and 38 are then utilized to charge condenser 47, which acts as a smoothing medium since it cannot discharge between pulses.

In the system of Figure 5 the gating wave generator is a pulser 120 which operates to generate pulses 121 when an A.-C. wave 122 passes through zero. Such pulsers are conventional in the art. The A.-C. wave 122 is provided by amplitude detecting the output of I. F. amplifier 33 in detector 123 and passing the detected result through a condenser 124 to remove the D.-C. component of the detected wave. The pulses occur then when the detected beat envelope 122 passes through zero, and this sufficiently approximates the arc cos $a$ point when $a$ is small, for practical purposes. Adjustment of the pulsing point may be attained by adding to the input of the pulser 120 a D.-C. bias, by means of a variable bias source 125, effectively to shift the times when A.-C. wave 122 passes through zero value, and thereby to shift the times of pulses 121, to allow for operation for a range of values of $a$.

It will be clear that further variations in detail, or in general arrangement, may be resorted to, in respect to any of the disclosed embodiments of my invention, in accordance with practices understood by those skilled in the pertinent art, and without departing from the true spirit and scope of the invention, as defined by the appended claims. Specifically, a large number of methods for generating pulses at predetermined amplitude points of a wave form are known, and may be employed instead of those herein illustrated and described as GWG1, GWG2 and GWG3. Particular reference is made to chapter 9 of Radiation Laboratory Series, #19, entitled "Wave forms," published in 1949 by McGraw-Hill Book Co., Inc., for details of gating wave generators suitable for use in the present system.

What I claim and desire to secure by Letters Patent of the United States is:

1. In a frequency modulation receiver wherein two overlapping frequency modulated waves, $E_1$ and $E_2$ having an amplitude ratio $$\frac{E_2}{E_1}=a<1$$

and an instantaneous frequency difference $q$, are received, and wherein it is desired to obtain modulation of the stronger of said waves to the substantial exclusion of the weaker, means for generating pulse gating voltages substantially at times when $qt=\pi\pm$ arc cos $a$, means responsive to said gating voltages for deriving from said overlapping frequency modulated waves energy pulses corresponding in amplitude with said modulation, and means responsive to said energy pulses for constructing said modulation.

2. In a frequency modulation receiver wherein two overlapping frequency modulated waves, $E_1$ and $E_2$, having an amplitude ratio $$\frac{E_2}{E_1}=a<1$$

and an instantaneous frequency difference $q$, are received, and wherein it is desired to obtain modulation of the stronger of said waves to the substantial exclusion of the weaker, means for generating pulse gating voltages substantially at times when $qt=\pi\pm$ arc cos $a$, means for limiting and discriminating said overlapping frequency modulated waves, to obtain modulation corresponding to said overlapping frequency modulated waves, means responsive to said pulse gating voltages for selecting, from said last mentioned modulation, pulses corresponding in time with said pulse gating voltages, and means responsive to said last mentioned pulses for constructing said modulation of the stronger of said waves.

3. The combination in accordance with claim 2 wherein the means for generating the gating voltages comprises means for adding to said two overlapping frequency modulated waves a wave of fixed frequency and adjustable amplitude to provide a sensing wave, means for frequency discriminating said sensing wave to provide pulses of varying amplitude, and means for selecting from said pulses of varying amplitude those pulses of amplitude exceeding a predetermined level.

4. The combination in accordance with claim 3 wherein said adjustable amplitude is selected to equal substantially the amplitude of said overlapping frequency modulated waves when $qt=\pi\pm$ arc cos $a$.

5. The combination in accordance with claim 2 wherein the means for generating the gating voltages comprises means for generating pulses having abrupt changes in level when $qt=\pi\pm$ arc cos $a$, and means responsive to said abrupt changes in level for generating said gating pulses.

6. In a frequency modulation receiver wherein two overlapping frequency modulated waves $E_1+E_2$ are received, where $$\frac{E_1}{E_2}=a<1$$

and where the beat frequency between the waves is $q$, means for abstracting from said waves $E_1+E_2$ modulation of $E_1$ to the substantial exclusion of modulation of $E_2$, comprising means for generating timed signals in accordance with a predetermined value of $qt$ at least adjacent $\pi\pm$ arc cos $a$, and means for providing modulation deriving from frequency modulation of said overlapping frequency modulated waves $E_1+E_2$ only during said timed signals.

7. The combination in accordance with claim 1 wherein said frequency modulation receiver is a superheterodyne receiver and includes an intermediate frequency amplifier and wherein said means responsive to said gating waves includes said intermediate amplifier.

8. The combination in accordance with claim 1 wherein said receiver includes an audio amplifier, and wherein said means responsive to said gating voltages includes said audio amplifier.

9. In a frequency modulation receiver wherein two overlapping frequency modulated waves, $E_1$ and $E_2$, having an amplitude ratio $$\frac{E_1}{E_2}=a<1$$

and an instantaneous frequency difference $q$, are received, and wherein it is desired to obtain modulation of the stronger of said waves to the substantial exclusion of the weaker, means for generating recurrent gating voltages substantially at times when $qt=\pi\pm$ arc cos $a$, means responsive to said gating voltages for deriving from said overlapping frequency modulated waves recurrent wave energy pulses having a wave energy characteristic representative of said modulation of the stronger of said waves, and means responsive to said wave energy pulses for constructing said modulation.

10. The combination in accordance with claim 9 wherein said characteristic is frequency.

11. The combination in accordance with claim 9 wherein said characteristic is amplitude.

RAYMOND M. WILMOTTE.

REFERENCES CITED

The following references are of record in the file of this patent:

UNITED STATES PATENTS

| Number | Name | Date |
|---|---|---|
| 2,194,292 | Bligh | Mar. 19, 1940 |
| 2,295,207 | Gabrilovitch | Sept. 8, 1942 |
| 2,361,437 | Trevor | Oct. 31, 1944 |
| 2,386,528 | Wilmotte | Oct. 9, 1945 |
| 2,467,486 | Krumhansl et al. | Apr. 19, 1949 |